United States Patent [19]

Pithouse et al.

[11] Patent Number: 4,761,194

[45] Date of Patent: Aug. 2, 1988

[54] METHOD OF ENVIRONMENTAL SEALING

[75] Inventors: Kenneth B. Pithouse, Lesulis, France; Thomas A. Kridl, Union City; James T. Triplett, Livermore, both of Calif.

[73] Assignee: Raychem Limited, London, England

[21] Appl. No.: 881,505

[22] Filed: Jun. 24, 1986

Related U.S. Application Data

[63] Continuation of Ser. No. 567,128, Dec. 30, 1983, abandoned.

[30] Foreign Application Priority Data

Jan. 6, 1983 [GB] United Kingdom ............... 8300220

[51] Int. Cl.⁴ .............. B29C 61/02; B29C 63/18; B32B 31/26
[52] U.S. Cl. ............... 156/86; 174/DIG. 8; 156/84; 264/230
[58] Field of Search ............. 264/230, DIG. 71; 174/DIG. 8; 156/84, 86; 428/36

[56] References Cited

U.S. PATENT DOCUMENTS

| 3,190,780 | 6/1965 | McNulty et al. | 156/392 |
| 3,328,222 | 6/1967 | Ambrose et al. | 264/257 |
| 3,616,146 | 10/1971 | Gabet | 428/261 |
| 3,795,573 | 3/1974 | Smith et al. | 428/261 |
| 4,225,370 | 9/1980 | Dickey | 156/84 |
| 4,261,776 | 4/1981 | Lea | 428/261 |

FOREIGN PATENT DOCUMENTS

| 2216388 | 8/1974 | France | 156/84 |
| 4405 | 2/1970 | Japan | 156/86 |
| 118211 | 7/1983 | Japan | 156/86 |

Primary Examiner—James Lowe
Attorney, Agent, or Firm—Herbert G. Burkard

[57] ABSTRACT

A method of environmentally sealing a pipe, cable or harness substrate by means of a recoverable fabric and a sheet of polymeric material.

2 Claims, 2 Drawing Sheets

METHOD OF ENVIRONMENTAL SEALING

RELATED APPLICATIONS

This application is a continuation, of application Ser. No. 567,128, filed Dec. 30, 1983, now abandoned.

FIELD OF THE INVENTION

This invention relates to heat-recoverable articles.

BACKGROUND OF THE INVENTION

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, an elastomeric member is held in a stretched state by a second member, which, upon heating weakens and thus allows the elastomeric member to recover. Heat-recoverable articles of this type are described, for example, in British Patent No. 1,440,524 in which an outer tubular elastomeric member is held in a stretched state by an inner tubular member.

Heat-recoverable articles have found particular use in the environmental protection of elongate substrates such as for example splices in telecommunication cables.

It has been proposed, in U.S. Pat. No. 3,669,157 to Carolina Narrow Fabric Company and in Japanese Pat. No. 53-13805 to Matsushita, to provide heat-shrinkable tubular fabric articles which may be impregnated with certain thermosetting resins. However, we have found that the articles disclosed therein are very difficult to install because they are subject to displacement of the resin on recovery, resulting in burst-through of fabric by the resin, or delamination of the resin from the fabric. Thus these prior art articles are of limited utility and are too craft-sensitive for use in most telecommunications applications.

SUMMARY OF THE INVENTION

The present invention provides an arrangement for covering at least part of a substrate, which comprises:

(a) a cover for the substrate formed from a dimensionally heat-recoverable fabric comprising fibres that will recover when heated to a recovery temperature thereof, the fibres having a tensile strength of at least 0.1 MPa at their recovery temperature; and (b) a sheet of polymeric material that will conform dimensionally with the fabric when the fabric is recovered, the sheet having one surface that will adhere to a substrate when heated and an opposite surface formed from a material having a viscosity of at least 5000 poise at the recovery temperature of the fibres.

DESCRIPTION OF THE INVENTION

The term "fibre" as used herein in connection with the heat-recoverable fibres includes filaments e.g. monofilaments, and the fabrics used in the arrangements according to the invention preferably employ the heat shrinkable fibres in the form of filaments, especially monofilaments.

The fibres are preferably formed from a polymeric heat-recoverable material. By "the recovery temperature" of polymeric heat-recoverable materials is meant that temperature at which the recovery of the polymeric material will go substantially to completion. In general, the recovery temperature will be the crystalline melting temperature if the polymer is crystalline or the glass transition temperature if the polymer is amorphous.

Preferably the fibres have a recovery temperature of at least 60° C., more preferably from 80 to 250° C. and especially from 120 to 150° C.

The heat-recoverable fibres are preferably formed from a polymeric material that imparts good physical properties and, in particular, good creep resistance to the fibres. Olefin polymers such as polyethylene and ethylene copolymers, polyamides, polyesters, acrylic polymers and other polymers capable of being cross-linked may be employed. A particularly preferred polymeric material for the fibres is based on polyethylene having a density of from 0.94 to 0.97/gms/cc, an Mw of from $80 \times 10^3$ to $200 \times 10^3$ and an Mn of from $15 \times 10^3$ to $30 \times 10^3$.

The fibres preferably have a minimum recovery stress of $10^{-1}$ MPa, more preferably $5 \times 10^{-1}$ and usually at least 1 MPa at a temperature above the transition temperature of the fibres. There is in theory no upper limit of recovery stress, but in practice 200 MPa and more usually 100 MPa is the highest figure normally achievable with polymeric fibres. The tensile strength of the fibres at their recovery temperature is preferably increased to 0.1 MPa or higher by cross-linking the polymeric material from which they are formed, either by chemical means or by irradiation e.g. high energy electron irradiation, gamma radiation or by ultra violet radiation.

When the fibre is cross-linked by irradiation it is convenient to incorporate the cross-linking step into manufacture of the fibre. The fibre can be extruded, stretched at a temperature below its melting temperature, preferably by an amount of from 800 to 2000 %, then subjected to irradiation to effect crosslinking. A less preferred way of making the fibre is to extrude the fibre, irradiate to cross-link, then heat the fibre, preferably to above its melting temperature, stretching the fibre, and then cooling the stretched fibre. High density polyethylene fibres are preferably irradiated with a dose of from about 5 to about 35 megarads, preferably from about 5 to about 25 megarads, and in particular from about 7 to about 18 megarads. Usually the gel content of the cross-linked fibre is greater than 20%, preferably greater than 30%, most preferably greater than 40%. In practice, gel contents greater than 90% are not easily achievable. The fibres preferably recover by at least 40%, more preferably at least 50% and especially at least 60% of their original length when heated.

The heat-recoverable fabric can, in the broadest aspect of the invention, be made solely of heat-recoverable fibres as described above or can contain other fibres in addition to the heat-recoverable fibres. The fabric can be knitted, woven, non-woven, braided, or the like. In a preferred embodiment the fabric is a woven fabric. The woven fabric can contain only heat-recoverable fibres or it can contain heat-recoverable fibres together with non-heat-recoverable fibres or filaments. For example, the fabric can contain heat-recoverable fibres in one direction and non-heat-recoverable fibers in the other. This produces a heat-recoverable fabric which is recoverable in only one direction. Particularly preferred fabrics are described in UK patent application Nos. 8300219 and 8300222 corresponding to U.S. patent application Ser. Nos. 567,121 (now U.S. Pat. Nos. 4,624,720) and 567,127 (now abandoned) respectively, both filed on Dec. 30, 1983. The fabric can be woven in a pattern, for example will, broken twill, satin, sateen, Leno, plain, hop sack, sack, matt and various weave combinations in single or multiple ply weaves e.g. 2 - or 3 - ply weaves. Preferably the fabric is a woven fabric that has heat-recoverable fibres in one direction and dimensionally heat-stable fibres in the other direction so that the fabric as a whole is recoverable in a single direction only, and the fabrics described below will, in general, be recoverable only in one direction.

The fabric may alternatively be knitted if desired, either warp knitted or weft knitted. If the fabric is solely from heat-recoverable fibres it will be recoverable in two dimensions, but if, as is preferred for the knitted fabrics, it is knitted from a heat stable fibre and a eat-recoverable fibre is either warp or weft inserted, it will be recoverable in only one direction.

The arrangement according to the invention may be used for a wide variety of purposes where substrates are to be enclosed, and is particularly suitable for enclosing elongate substrates such as pipes, cables, harnesses or the like, especially for telecommunication cables and splices therein. The fabric may be formed in a number of configurations depending on its intended use. Thus the fabric may be tubular in shape or have multiple tubular portions for example as in the case of a cable break-out. If the arrangement is intended to enclose part of an elongate substrate of which the ends are not readily accessible, the article may be formed as a so-called wraparound article in which the fabric assembly has an open cross-section, e.g. it may be substantially in sheet form, and has two opposed edge portions extending perpendicularly to the direction of recovery, which edge portions are capable of being retained together against the recovery forces of the fabric. The article can simply be wrapped around the substrate to be enclosed and the edge portions be retained together so that the article will recover onto the substrate in the form of a sleeve on the application of heat. Wraparound articles formed from fabrics and suitable closure arrangements therefore are described in more detail in UK patent application No. 8300223 corresponding to U.S. patent application Ser. No. 822,683, now U.S. Pat. No. 4,707,388, filed on June 13, 1984.

The polymer material forming the sheet can be either a thermoplastic or an elastomer. Examples of the former class of polymers include ethylene/vinyl acetate copolymers, ethylene/ethyl acrylate copolymers, polyethylenes including the linear low, low density and high density grades, polypropylene, polybutylene, polyesters, polyamides, polyetheramides, perfluoroethylene/ethylene copolymer and polyvinyl fluoride. Considering the second class of materials this can include acrylonitrile butadiene styrene block copolymer, acrylic elastomers including the acrylates and methacrylates and their copolymers, e.g. polybutyl acrylate, and poly 2-ethylhexyl acrylate, the high vinyl acetate copolymers with ethylene (VAE's), polynorbornene, polyurethanes and silicone elastomers and the like. The polymeric material can be cross-linked, for example, a cross-linked ethylene/vinyl acetate copolymer, a linear low density or high density grade polyethylene or an acrylic elastomer. The most preferred materials for forming the polymeric layer are hot melt adhesives. Hot-melt adhesives which can be used include polyamide and ethylene vinyl acetate copolymer based adhesives. Such adhesives are well known, for example see U.S. Pat. Nos. 4,018,733, and 4,181,775, the disclosures of which are incorporated herein by reference. If desired a heat-curable adhesive may be used for example as described in U.K. patent application No. 8,224,379 corresponding to U.S. patent application Ser. No. 567,129 (now abandoned) filed Dec. 30, 1973 provided that the viscosity thereof does not fall below 5000 poise during recovery of the fabric.

As stated above, the sheet has one surface that will adhere to a substrate when heated. Adhesion to the substrate is necessary in order to provide an adequate seal against ingress of moisture or escape of fluid such as pressurising fluid from a pressurised telecommunication cable. Preferably the surface is formed from a material having a tack temperature not higher than 50° C. above the recovery temperature of the fibres and especially at least 20° C. below the recovery temperature of the fibres. The tack temperature may be as low as ambient temperatures or even lower, for example the surface is provided by a layer of a mastic, although it is preferred for the surface to become tacky only at elevated temperatures partly because this obviates the necessity to cover the surface with a non tacky release layer, and partly because this enables a single material to be used for the entire polymeric sheet. The tack temperature as used herein may be measured from the softening characteristics of the material as determined by thermomechanical analysis (TMA) as described in "Thermal Analysis" by T. Daniels published by Kogan Page 1973, in which case the temperature $T_0$ being the intercept of the maximum gradient of probe penetration (with respect to temperature) and the horizontal line of zero penetration, can be taken as the tack temperature.

The other surface of the polymer layer has, as stated above, a viscosity of at least 5000 poise at the recovery temperature of the fibres. This minimum value of the viscosity is necessary in order to prevent the polymeric material flowing through the fabric during recovery thereof and allowing the fabric to displace the polymeric material under its recovery forces. Preferably the polymeric material forming the other surface has a complex dynamic viscosity of at least 7000 poise at a temperature of at least 100° C. above the recovery temperature of the fibres. If the material forming the other surface has a viscosity above these minimum values at the higher temperature of 100° C. above the recovery temperature of the fibres, it is found that it is possible to recover the arrangement by means of a gas torch or a hot air gun in which the fabric and the outer surface of the polymer material experience somewhat higher temperatures than the recovery temperature of the fabric. Whilst, in the broadest aspect of the invention there is no upper limit of the viscosity of the polymeric sheet provided that it is able to conform to the change in dimensions of the fabric during recovery thereof, it is found that materials having a surface in contact with the fabric of viscosity of not more than $10^6$ poise, more preferaby not more than $10^5$ poise and especially not more than $5 \times 10^4$ poise at the recovery temperature of the fibres are preferred in order that the polymeric material bonds to the fabric during recovery.

The polymeric material preferably has a softening point below the recovery temperature of the fibres, especially at least 20° C. below the recovery temperature in order to enable it to conform to the change in dimensions of the fabric during recovery. In order to enable the polymeric material to soften at the recovery temperature of the fibres without flowing or without the viscosity thereof falling below 5000 poise, it may be advantageous for the material to be cross-linked, for example by irradiation e.g. ultraviolet or gamma radiation or electron irradiation or by means of chemical cross-linking agents. Where the material is cross-linked by irradiation, doses of at least 1, preferably at least 2 Mrads are preferred but more preferably not more than 20 Mrads, e.g. up to 10 Mrads and especially up to 5 Mrads. Whether the material is cross-linked chemically or by irradiation, it preferably has a gel content of at least 20%, especially at least 30% and most especially at least 40% but usually not more than 80% e.g. up to 70%.

The sheet of polymeric material will usually have a thickness of at least 0.05, preferably at least 0.1 especially at least 0.2 and most especially at least 0.3 mm but usually not more than 3, preferably not more than 2 and more preferably not more than 1 mm. The thickness of the sheet will depend to some extent on the physical properties of the polymeric material and on those of the fabric. Thus, the assembly formed by the fabric and the polymeric sheet together with any additional polymeric layers that may be present preferably satisfy the inequality below at the recovery temperature of the fibres:

$$\frac{X(1-R)}{Y \cdot R}$$

is less than 1, preferably less than 0.5 and especially less than 0.05.

wherein X is the 20% secant modulus of the polymeric material (measured at a strain rate of 300% per minute);

Y is the recovery stress of the fibres; and

R is the mean effective volume fraction of heat-recoverable fibres in the assembly based on the total volume of the assembly, or relevant portion thereof.

We prefer that the fabric (or the fibres thereof) are cross-linked and that the polymeric material is cross-linked. In general the two cross-linking steps will be carried out separately.

The fibres are desirably cross-linked to increase their post-recovery strength, and a recovery stress of at least 1 MPa, preferably 1.5 to 5 MPa will generally be suitable. The polymeric material is desirably cross-linked to prevent it dripping or running during heat recovery, particularly during heat recovery by means of a torch. Too much cross-linking of the polymeric material may, however, hinder recovery of the fabric. The extent of cross-linking treatment in the two components may differ due to different cross-linking responses (beam response in the case of irradiation cross-linking, for example) of the types of material used for the fibres and the polymeric material, or it may result from the treatment undergone by the fibres and polymeric material. This second effect includes the reduced beam response of the fibres that result from their orientation produced by drawing to make them recoverable.

An assembly of fabric and polymeric material (loosely held together or bonded) may, nonetheless, be subjected to a single cross-linking step if the beam response of the recoverable fibres relative to that of the polymeric material is such that a post-irradiation recovery stress of the fibres, per se, of at least 1 MPa can be reached before the recovery ratio of the assembly is reduced to a value of 70% of that of the unirradiated composite structure.

The relative beam response may be produced by the presence of prorads in the recoverable fibres and/or antirads in the polymeric material.

In a preferred embodiment of the invention the fabric is associated with a flexible polymeric material to produce an assembly, in which:

(a) the recoverable fabric comprises a cross-linked recoverable polyolefin having a recovery stress of 1.5 to 5 MPa; and (b) the polymeric material is cross-linked such that the recovery ratio available in the fabric is at least 65% of that available in the free fabric, and the polymeric material, per se, after irradiation has a room temperature elongation of 400–700% measured at a strain rate of 300% minute.

Irradiation, in addition to providing one means of cross-linking, can provide other features in the assembly. If the fibers are irradiated, particularly in the presence of oxygen, before installation of the polymeric material then a change in the surface properties of the fibres may occur (such as oxidation) which causes or improves adhesion between the fibres and the polymeric material when the product is installed using heat. An irradiation step after application of the polymeric material may also produce a bond by forming crosslinks between the two components of the composite structure.

According to a preferred aspect of the invertion the properties of the polymeric material forming the sheet are such as to enable the arrangement once recovered, to withstand an internal pressure from the substrate, for example in the order of about 70 kPa in the case of a pressurised telecommunication cable, without failure. The ability to withstand such pressures depends on the properties of the sheet material at the use temperature, usually ambient temperature, and is found to be largely independent of the density of fibres or pore size of the fabric. Thus, preferably the material has a tensile strength of at least 20, more preferably at least 30, and especially at least 40 MPa at ambient temperatures although it is not usually necessary for the tensile strength to exceed 500 MPa and will most usually be up to 400 e.g. up to 300 MPa. In addition or alternatively the tensile modulus of the material is preferably at least 100, more preferably at least 200 and especially at least 400 MPa but usually is not more than 5000, e.g. up to 4000 and most usually up to 3000 MPa. For pressurised applications the material should not exhibit significant viscous flow at ambient temperatures and it is accordingly preferred that the viscosity of the material at ambient temperature is at least $10^7$, more preferably at least $10^8$ most preferably at least $10^9$ and especially at least $10^{10}$ poise. These characteristics are advantageously imparted to the material by crosslinking the material as described above either chemically or by irradiation.

It is possible for the sheet of polymeric material to be bonded to the fabric as supplied, in which case the said opposite surface is in contact with the fabric. In this case the fabric is preferably at least partially embedded in the sheet to form a composite structure as described in UK patent application No. 8300218 corresponding to U.S. patent application Ser. No. 567,129 (now abandoned) filed Dec. 30, 1983. Alternatively, however, the arrangement may comprise the sheet and the fabric cover as separate items in which case the arrangement is installed by positioning the sheet about the substrate to enclose at least a part thereof with the said one surface in contact with the substrate, positioning the cover about the sheet and in contact with the said opposite surface thereof, and heating the arrangement to cause the fabric to recover.

The use of arrangements in which the fabric cover and the polymeric sheet are used separately so that a composite structure is formed in situ has the advantage that since the fabric can be completely unlaminated it is relatively deformable manually and so can be distorted to some extent by the operator in order to position it correctly about substrates of awkward configuration such as right-angled bends, the polymeric sheet having previously been positioned about the substrate e.g. in the form of a wrapped tape. Furthermore, the present invention enables the cover, especially if it has a complex shape such as a Y piece, branch-off or multi-legged udder, to be made in a simple manner because the use of a separate polymeric sheet obviates the necessity to coat the internal surface of the cover.

The ability of the fabric to be penetrated without splitting means that a wide range of closure means can be used to join together portions of the fabric or to hold the fabric in, for example, a wraparound configuration or in a complex shape such as a Y-piece or branch-off etc. In general, the arrangement of the invention may comprise at least two fabric portions joined together along a line by means of a mechanical joining arrangement, for example stitches or staples, which penetrates the fabric.

The fabric cover used in the arrangement according to the invention may be used without any coating or, if it is required that the cover be recovered by means of a harsh heat source such as a gas torch, it may be desirable to coat the external surface of the fabric with a layer of polymeric material to a thickness e.g. of at least 0.03, preferably at least 0.07 and especially at least 0.2 mm, which layer is preferably substantially unstressed, as described in UK patent application No. 8300217 equivalent to U.S. patent application Ser. No. 567,122 filed Dec. 30, 1983, now U.S. Pat. No. 4,631,098.

BRIEF DESCRIPTION OF THE DRAWINGS

Several arrangements in accordance with the invention will now be described by way of example with reference to the accompanying drawings, in which.

DETAILED DESCRIPTION OF EMBODIMENTS

Figure 1:
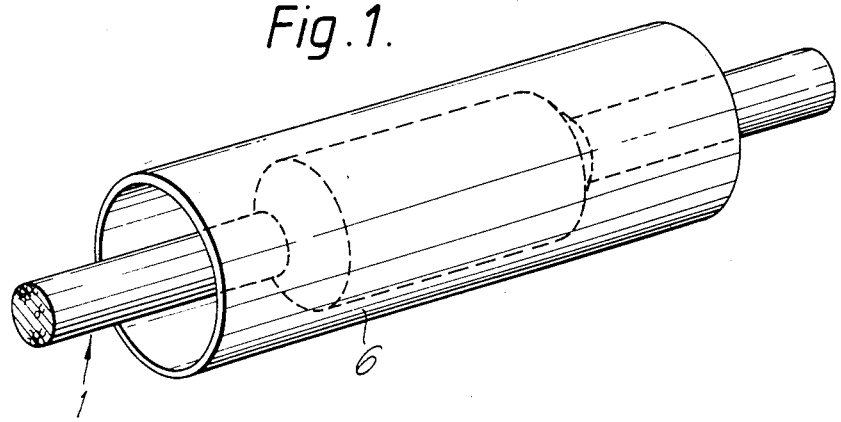
FIG. 1 is a perspective view of a substrate during installation of the arrangement.
Figure 2:
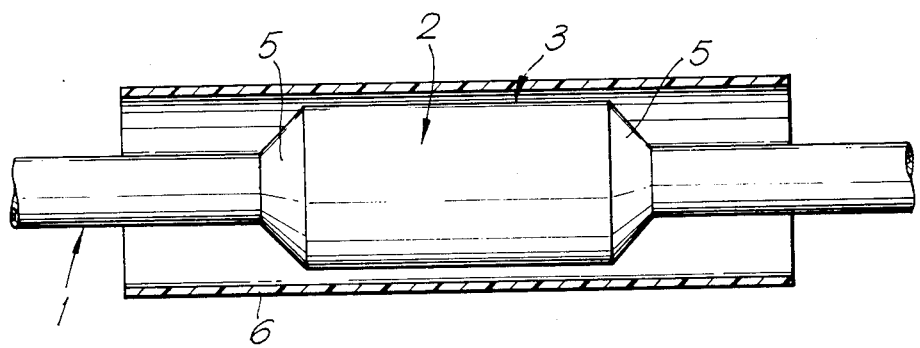
FIG. 2 is a longitudinal section through the substrate of FIG. 1.
Figure 3:
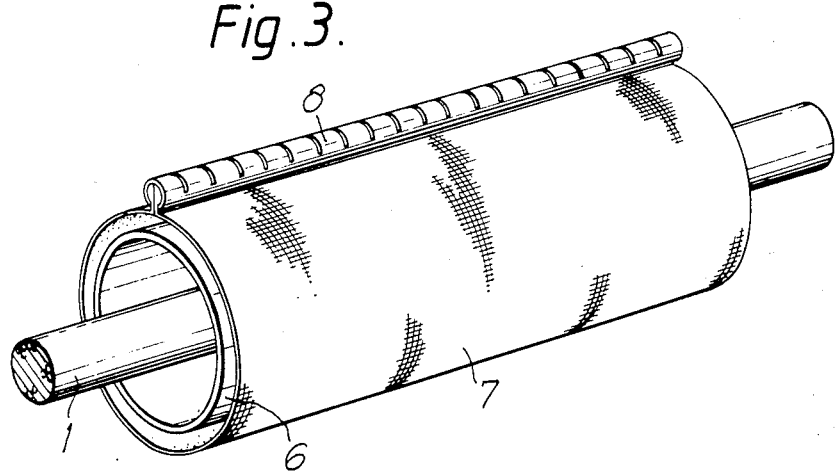
FIG. 3 is a perspective view of the substrate of FIG. 1 after the cover has been positioned thereon.
Figure 4:
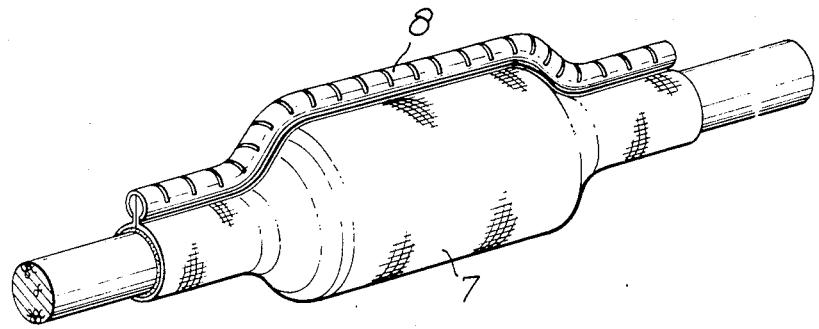
FIG. 4 is a perspective view of the substrate of FIG. 1 after the cover has been recovered.

Referring to FIGS. 1 to 5 of the accompanying drawings a substrate in the form of a telecommunication cable 1 has a splice 2 therein which is covered by a metal liner 3 having a cylindrical central portion of relatively large diameter and tapering frusto-conical ends 5. In order to provide the cable splice with an impermeable casing a sheet 6 of polymeric material, e.g. a polyamide adhesive that has been crosslinked by high energy electrons to a dose of about 5 Mrads is wrapped around the metal liner 3 so that its ends overlap by about 3 cm as shown in FIGS. 1 and 2. Then a cover is formed from a fabric 7 by folding edges of the fabric back on themslves thereby trapping a rod at the edges. The two edge portions, thus thickened, can be held together by means of a channel C-shaped in cross-section (8). The resulting wrap-around cover is wrapped around the liner and sheet and its ends secured by means of the closure arrangement 8. The cover is then heated for example by means of a hot air gun until the fabric has recovered about the liner and onto the ends of the cable to form the arrangement as shown in FIG. 4.

The fabric is preferably an eight shaft satin weave employing 0.29 mm diameter high density polyethylene filaments in the warp (circumferential) direction and 75 E.C.G. glass fibre yarn in the weft (axial) direction. The weave density is about 90/16 (warp density/ weft density measured in fibres per inch, or 35.4/6.3 in cms) and the polyethylene fibres gave been irradiated with 1.5 MeV electrons to a dose of 15 Mrads to give them a gel content 37.3% (refluxing in xylene), a 100% secant modulus of 10.60 at 150° C. and a percentage recovery of about 70%.

Figure 5:
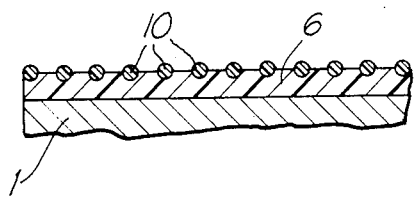
FIG. 5 is a section through the cover and sheet of the arrangement after installation.

FIG. 5 is a schematic section through the fabric and polymeric sheet after recovery onto the substrate 1 and shows the glass fibre weft yarn 10 and the polymeric material of the sheet 6 which has become partially embedded in the fabric but has not completely penetrated the fabric.

Figure 6:
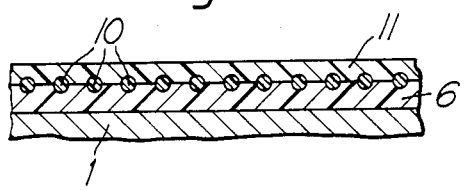
FIG. 6 is a section through an alternative arrangement after installation.

FIG. 6 is a schematic section through another form of arrangement after recovery onto a substrate 1 in which the fabric is provided with an additional layer 11 of polymeric material to improve its ability to be recovered by means of a gas torch.

The following Examples illustrate the invention.

EXAMPLE 1 TO 18

A heat recoverable twill fabric was formed from 0.35 mm high density polyethylene fibres in the warp and 150 E.C.G. glass fibre yarn in the weft. The fabric density (warp density/weft density, measured in fibres per inch) was 60/22. The fabric was irradiated with 1.5 MeV electrons to a dose of 15 Mrads to give the warp fibres a gel content of 37.3% (refluxing in xylene), a 100% secant modulus of 0.60 at 150° C. and a recovery percentage of about 70%.

A 0.5 mm thick sheet of various polymeric materials was positioned over a substrate and the fabric was recovered thereon by placing the arrangement in an oven. After recovery the fabric was examined to see whether or not the sheet material had burst through the pores of the fabric and also the adhesion of the fabric to the sheet material was tested and recorded as poor if they could easily be pulled apart manually, moderate if they could be pulled apart manually but showed significant adhesion, and good if they could not be pulled apart. The sheet materials are shown in table I and the results are shown in table II.

TABLE I

| Example | Sheet Material | Electron irradiation dose (Mrad) |
|---|---|---|
| 1 | Low density polyethylene | 0 |
| 2 | Low density polyethylene | 5 |
| 3 | Low density polyethylene | 10 |
| 4 | Low density polyethylene | 20 |
| 5 | ethylene/vinyl acetate copolymer | 0 |
| 6 | ethylene/vinyl acetate copolymer | 5 |
| 7 | ethylene/vinyl acetate copolymer | 10 |
| 8 | ethylene/vinyl acetate copolymer | 20 |
| 9 | low viscosity polyamide | 0 |
| 10 | low viscosity polyamide | 5 |
| 11 | low viscosity polyamide | 10 |
| 12 | low viscosity polyamide | 20 |
| 13 | high viscosity polyamide | 0 |
| 14 | high viscosity polyamide | 5 |
| 15 | high viscosity polyamide | 10 |
| 16 | high viscosity polyamide | 20 |
| 17 | butadiene rubber based mastic | 0 |
| 18 | bitumen based mastic | 0 |

TABLE II

| EXAMPLE | Sheet material viscosity at recovery temperature (poise) | Burst through | Adhesion |
|---|---|---|---|
| 1 |  | No | poor |
| 2 | $1.2 \times 10^5$ | No | poor |
| 3 |  | No | poor |
| 4 | $1.5 \times 10^5$ | No | poor |
| 5 | $3.2 \times 10^3$ | Yes | good |
| 6 | $1.1 \times 10^4$ | No | good |
| 7 | $1.6 \times 10^4$ | No | good |
| 8 | $6.6 \times 10^4$ | No | moderate |
| 9 | $3.5 \times 10^3$ | Yes | good |
| 10 | $4.4 \times 10^3$ | Yes | good |
| 11 | $6.3 \times 10^3$ | No | good |
| 12 | $8.7 \times 10^3$ | No | good |
| 13 | $4.3 \times 10^3$ | Yes | good |
| 14 | $5.5 \times 10^4$ | Yes | good |
| 15 | $1.1 \times 10^4$ | No | good |
| 16 | $2.0 \times 10^4$ | No | good |
| 17 | $2.3 \times 10^3$ | Yes | good |
| 18 | $5.1 \times 10^2$ | Yes | good |

EXAMPLES 19 TO 36

Examples 1 to 18 were repeated with the exception that the fabric used was a more open fabric, namely a satin weave having a weave density of 60/12. The results obtained in terms of adhesion and burst through were the same as for Examples 1 to 18 indicating that pore size of the fabric does not significantly affect the required viscosity.

We claim:

1. A method of envornimentally sealing a pipe, cable or harness substrate by means of a sheet of polymeric material and a heat-recoverable fabric, which method comprises:
    (a) installing around the pipe, cable or harness substrate the sheet of polymeric material (i) that will conform dimensionally with the fabric when the fabric is recovered, (ii) having a viscosity of at least 5000 poise at a temperature T, (iii) that will not flow through the fabric during recovery thereof and (iv) that has one surface that will adhere to a substrate when heated; and
    (b) installing around the sheet of polymeric material a heat recoverably woven, knitted or braided fabric such that after installation the fabric has a tubular configuration around the pipe, cable or harness substrate, the fabric comprising fibres with will recover when heated to a recovery temperature (T) thereof, of from about 80°–250° C., the fibres having a tensile strength of at least 0.1 MPa at their recovery temperature; and
    (c) heating the fabric to cause it to engage the pipe, cable or harness substrate, and the sheet of polymeric material and cause the sheet to adhere to the substrate.

2. A method according to claim 1, in which the substrate comprises a pipe of a cable or a joint or splice therein.

* * * * *